United States Patent [19]
Sakamoto

[11] Patent Number: 5,837,176
[45] Date of Patent: Nov. 17, 1998

[54] METHOD OF HOT-PRESS MOLDING POLYPARAPHENYLENETEREPHTHALAMIDE FILM

[75] Inventor: Yoshio Sakamoto, Tokyo, Japan

[73] Assignee: Kabushiki Kaisha Kenwood, Japan

[21] Appl. No.: 610,841

[22] Filed: Mar. 5, 1996

Related U.S. Application Data

[63] Continuation of Ser. No. 223,964, Apr. 6, 1994, abandoned.

[30] Foreign Application Priority Data

Apr. 9, 1993 [JP] Japan ................................ 5-107368

[51] Int. Cl.$^6$ .................................................. B29C 43/04
[52] U.S. Cl. .................... 264/101; 264/294; 264/320; 264/331.12; 264/343; 264/345
[58] Field of Search ................................ 264/101, 294, 264/319, 320, 331.12, 335, 343, 345, 346

[56] References Cited

U.S. PATENT DOCUMENTS

| | | | |
|---|---|---|---|
| 3,966,686 | 6/1976 | Asakura et al. | 528/348 |
| 4,752,643 | 6/1988 | Imanishi et al. | 528/348 |
| 5,283,027 | 2/1994 | Sakamoto et al. | 264/320 |

FOREIGN PATENT DOCUMENTS

| | | |
|---|---|---|
| 0406832 | 1/1991 | European Pat. Off. . |
| 1729058 | 3/1972 | Germany . |
| 2239743 | 5/1979 | Germany . |
| 2-292020 | 12/1990 | Japan . |
| 3-32817 | 2/1991 | Japan . |
| 3-38200 | 2/1991 | Japan . |
| 2200515 | 8/1988 | United Kingdom . |

OTHER PUBLICATIONS

Patent Abstracts of Japan, Polyamide Film and Preparation Thereof, Apr. 14, 1988 Group No. M685, vol. 12, No. 120 Abstract of Japanese Application 61–88322.
Jastrzebeski, The Nature and Properties of Engineering Materials, 2d Ed., pp. 230–231, 1976.
Brady et al., Materials Handbook, 12th Ed., pp. 934–935, 1986.

*Primary Examiner*—Catherine Timm
*Attorney, Agent, or Firm*—Sixbey, Friedman, Leedom & Ferguson, P.C.; Gerald J. Ferguson, Jr.; Tim L. Brackett, Jr.

[57] ABSTRACT

A film molding method and apparatus capable of shortening a mold cycle time and obtaining a molded product of an excellent quality. A method of hot-press molding a polyparaphenyleneterephthalamide (PPTA) film into a predetermined shape includes a first step of evaporating water from a PPTA film containing water at least 50% or more as a swelling agent, and obtaining an amorphous film having a density less than a predetermined density and a modulus in tension of about 70%; and a second process of hot-press molding the film for a predetermined time period by metal molds heated up to at least 330° C. to crystallize the film to have a predetermined density specific to a PPTA film and produce an intrinsic physical value, and obtaining a molded product of the film. A film molding apparatus for performing the film molding method includes holes or slits opening at the surface of each of the metal molds, and an air suction unit and an air exhaust unit provided for each of the metal molds.

11 Claims, 12 Drawing Sheets

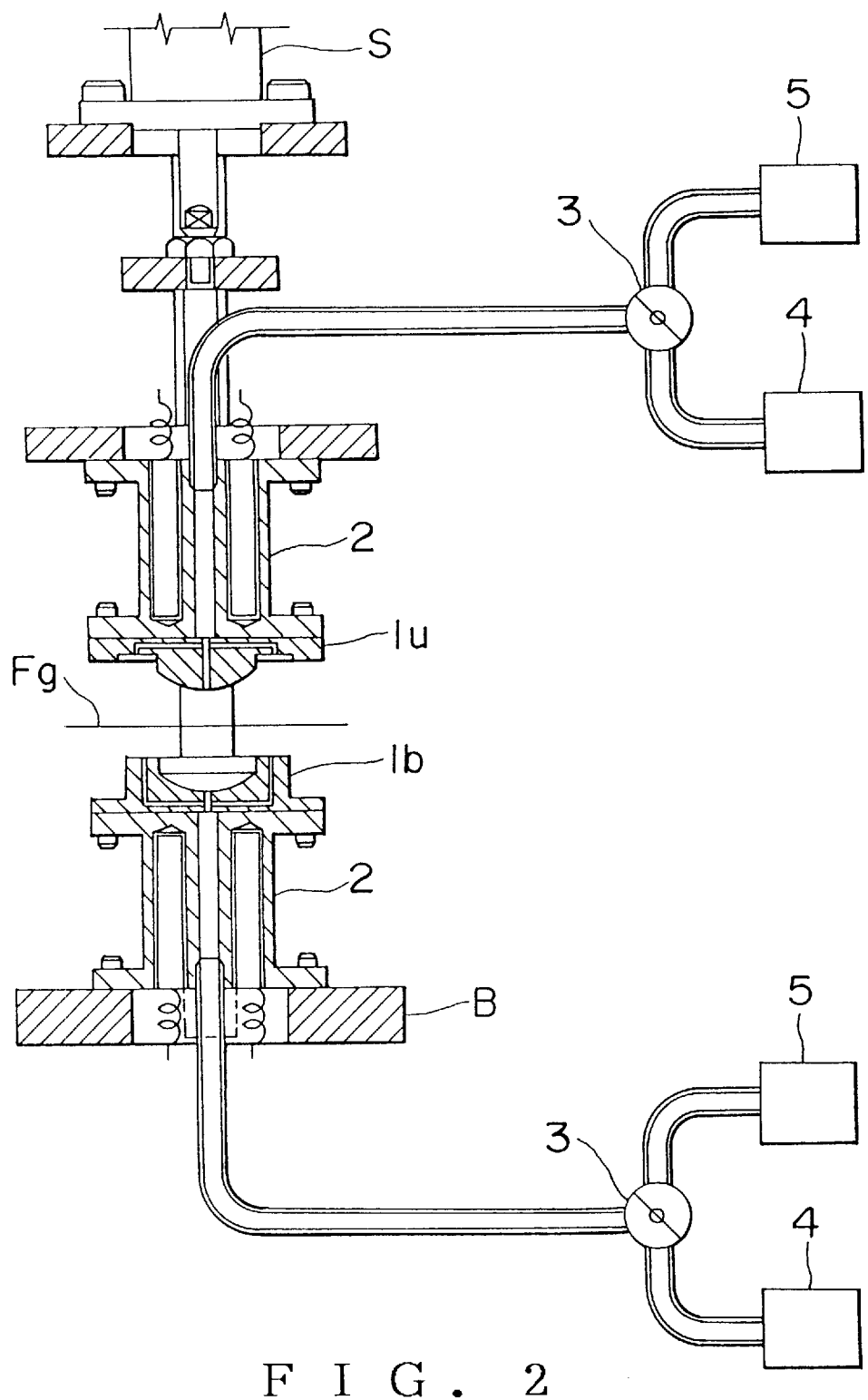
F I G . 2

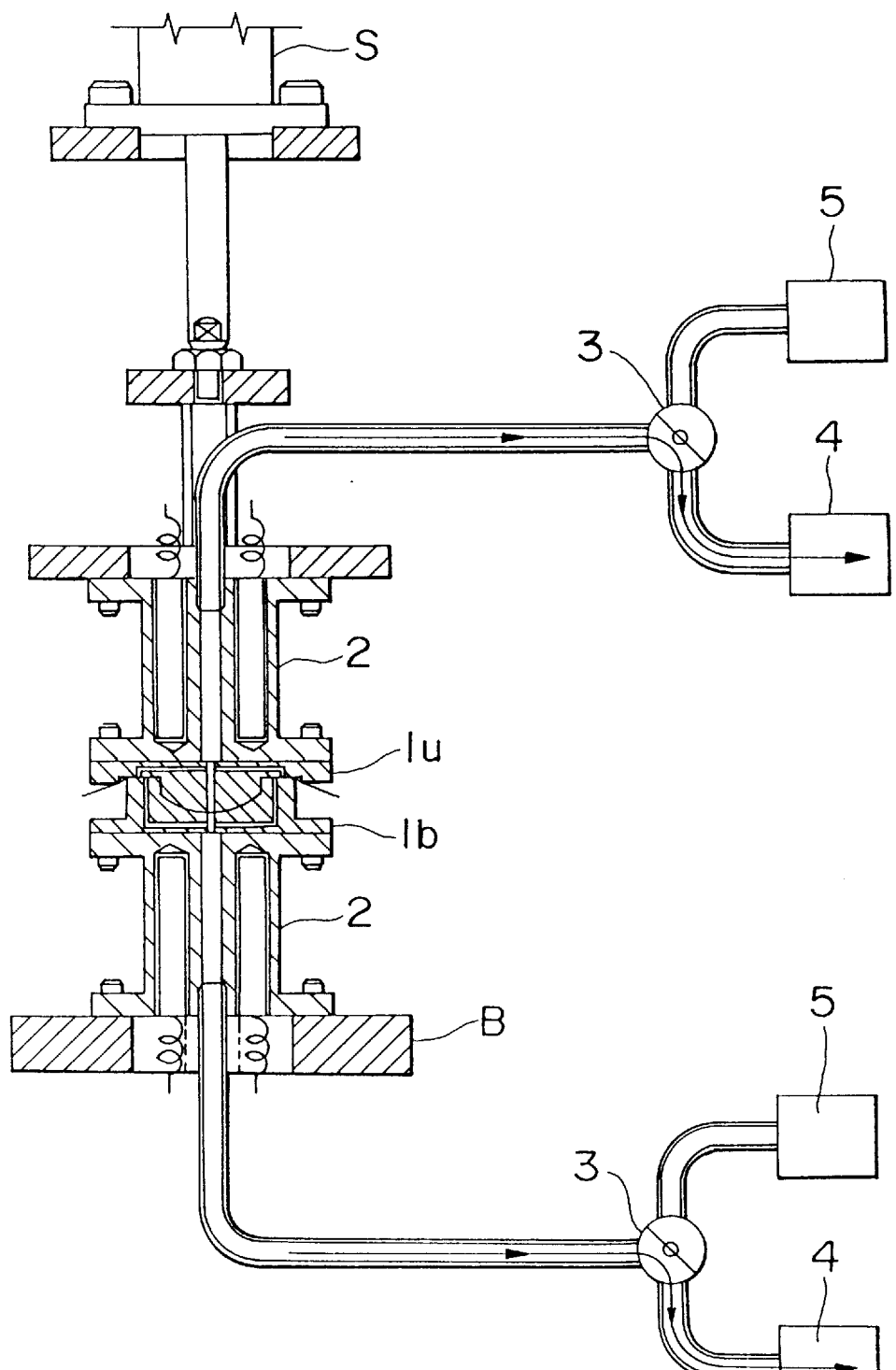
F I G . 3

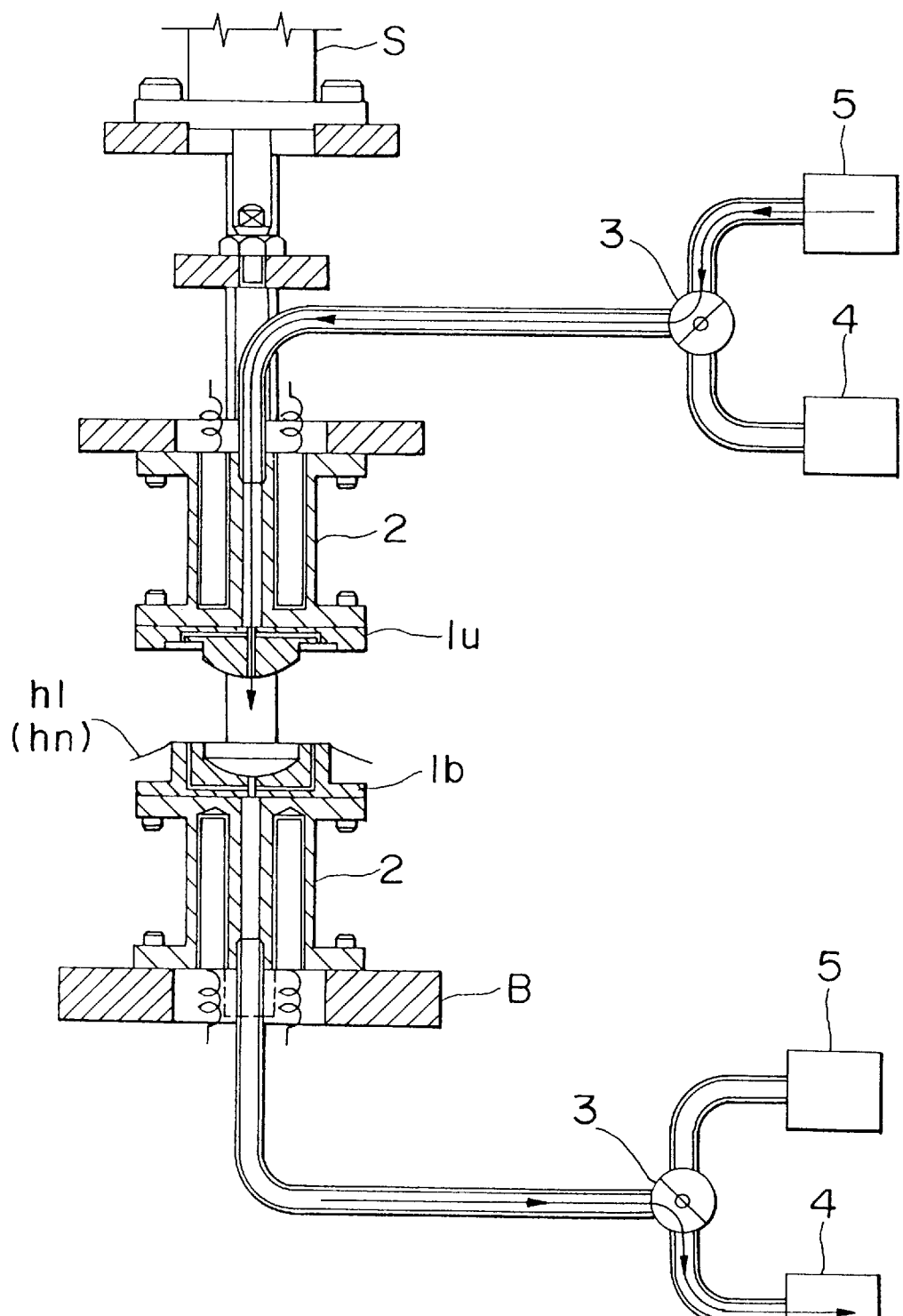
F I G . 4

METHOD OF HOT-PRESS MOLDING POLYPARAPHENYLENETEREPHTHALAMIDE FILM

This application is a Continuation of Ser. No. 08/223, 964, filed Apr. 6, 1994, now abandoned.

BACKGROUND OF THE INVENTION

1. Field of the Invention

The present invention relates to a method and apparatus for hot-press molding a para-orientation aromatic polyamide film, particularly a typical polyparaphenyleneterephthalamide (hereinafter called "PPTA") film, into a predetermined shape, capable of efficiently molding a film with a good quality.

2. Related Background Art

A para-orientation aromatic polyamide film, particularly a PPTA film, has an excellent acoustic property. The present inventors have proposed an acoustic vibration member made of a molded PPTA film and methods of molding a PPTA film (Japanese Patent Laid-open Publication No.3-38200).

According to the first method of these molding methods, a PPTA film in a gel state containing water at least 50% or more, or preferable 80% or more, as a swelling agent and having a 100% percentage elongation at break is hot-press molded by a hot pressing machine, and is thermally fixed while clamping the film by metal molds. According to the second molding method, a PPTA film thermally treated in an unrolled state to have a percentage elongation at break of about 40% or more is hot-press molded by a hot pressing machine. Using the first and second molding methods, mass production of acoustic vibration members has been performed conventionally the modulus in tension (%) is defined as (L-Lo)/Lo×100, wherein Lo is the initial length of the specimen and L is the elongation at the moment of rupture of the elongated specimen.

The outline of the first method will be described with reference to FIGS. 9 to 12. A gel film Fg containing water at least 50% or more, preferable 80% or more, as a swelling agent, is clamped by metal molds $1u$ and $1b$ heated to about 150° C., and thereafter the molds are heated up to 350° C. or more. Thereafter, the upper mold $1u$ is cooled down to 140° to 150° C. and the lower mold $1u$ is cooled down near 150° to 160° C. Lastly, the metal molds $1u$ and $1b$ are released to dismount the molded film.

More particularly, as shown in FIG. 9, the gel film Fg is introduced to the intermediate of the upper and lower metal molds $1u$ and $1b$. As the metal molds lower, the heater blocks 2 heated to about 380° to 400° C. move to attach the back surfaces of the upper and lower metal molds $1u$ and $1b$ so that the metal molds are heated and the gel film Fg is clamped by the metal molds. The temperature of the upper and lower metal molds $1u$ and $1b$ at the time when the clamping starts is 140° to 150° C. After the clamping, the metal molds $1u$ and $1b$ immediately raise their temperatures because the heater blocks 2 heated to 380° to 400° C. contact the metal molds.

As the temperatures of the metal molds $1u$ and $1b$ rise, water contained in the film Fg vaporizes in an accelerated manner and is expelled out of the metal molds $1u$ and $1b$. When the metal mold temperature rises and reaches a predetermined temperature 350° C. or more), the film eventually undergoes a thermal process so that the film is crystallized to have a predetermined density specific to a PPTA film and produce an intrinsic physical value.

However, although a PPTA film has a high elastic modulus, it takes a lower elastic modulus at such a high temperature of 350° C. or more.

Releasing the metal molds at such a high temperature may deform the molded PPTA film by friction between the metal molds $1u$ and $1b$ and the film when the latter is dismounted from the metal molds. In order to avoid the deformation by friction, it is therefore preferable to lower the film temperature by recovering the intrinsic modulus of the PPTA film. From this reason, while the metal molds $1u$ and $1b$ maintain clamping the film, the heater blocks 2 detach from the bottom surfaces of the upper and lower metal molds $1u$ and $1b$, and as shown in FIG. 11, cooler blocks $2c$ slide and move to tightly contact the bottom surfaces of the upper and lower metal molds $1u$ and $1b$. Cooling air is jetted out of holes formed in the cooler blocks $2c$ to cool the upper and lower metal molds $1u$ and $1b$ to a predetermined temperature (140° to 150° C.). Thereafter, as shown in FIG. 12, the upper and lower metal molds $1u$ and $1b$ are released to dismount the molded film, and the cooler blocks return to the predetermined positions.

The outline of the second molding method will be described with reference to FIGS. 13 to 16. A hard film Fh thermally treated to have a percentage elongation at break of 40% or more in an unrolled state is introduced to the intermediate of upper and lower metal molds $1u$ and $1b$.

Heater blocks 2 are made in tight contact with the bottom surfaces of the metal molds $1u$ and $1b$ and the metal molds $1u$ and $1b$ heated to about 350° C. clamp the film Fh as shown in FIG. 14. This state is maintained for a predetermined time period (10 to 30 seconds). Thereafter, the temperature of the film is lowered in order to avoid a deformation of the film by friction when the film is dismounted as described previously.

Specifically, while the metal molds $1u$ and $1b$ clamp the film, the heater blocks 2 detach from the bottom surfaces of the upper and lower metal blocks $1u$ and $1b$. Thereafter, as shown in FIG. 15, cooler blocks $2c$ slide to tightly contact the bottom surfaces of the upper and lower metal molds $1u$ and $1b$. Cooling air is jetted out of holes formed in the cooler blocks $2c$ to cool the upper and lower metal molds $1u$ and $1b$. As shown in FIG. 15, when the upper and lower metal molds $1u$ and $1b$ have been cooled down near to 80° C., the upper and lower metal molds $1u$ and $1b$ are released to dismount the molded film therefrom, and the heater blocks 2 and cooler blocks $2c$ are returned to the predetermined positions.

The first and second molding methods have the same process that the molded film heated up to 350° C. is cooled while it is clamped by the upper and lower metal molds $1u$ and $1b$. As stated before, a PPTA film heated to 350° C. or more has a lower elastic modulus. Therefore, if the metal molds are released immediately after the molding, the film has a strength insufficient for maintaining the molded shape, and is likely to be deformed by friction between the film and the molds when the molds are released or the film is dismounted from the molds. It is therefore necessary to cool the film until it has a strength resistant to such friction between the film and the molds when the molds are released or the film is dismounted from the molds.

In the first and second molding methods, the necessary condition is to heat the metal molds to 350° C. and cool them down to 160° C. or near to 80° C. This condition elongates one mold cycle time. Presently, the mold cycle time is about 5 minutes at the shortest, and under poor maintenance of the molding machine, it takes about 7 to 8 minutes.

SUMMARY OF THE INVENTION

It is an object of the present invention to solve the above-described problem and provide a film molding method and apparatus capable of shortening a mold cycle time and obtaining a molded film having an excellent quality.

In order to solve the above problem, the present invention provided the film molding method which basically includes a first process and a second process. The first process is a process of removing water contained in a gel PPTA film as a swelling agent, and the second process is a thermal treatment process for thermally fixing the gel PPTA film and producing an intrinsic performance of the film. By dividing the method into the first and second processed, a cooling time in one mold cycle becomes zero.

According to a film molding method of this invention, in a film molding method of hot-press molding a film made of substantially para-oriented aromatic polyamide having a modulus in tension of 600 Kg/mm$^2$ or more, particularly a typical PPTA film, into a predetermined shape, the first process evaporates water from a PPTA film containing water at least 50% or more, or preferably 80% or more, as a swelling agent, and obtaining an amorphous film having a density less than a predetermined density and a percentage elongation at break of about 70%., and the second process hot-press molds the film for a predetermined time period by metal molds heated up to at least 330° C., or preferably 350° C. or more to crystallize said film to have a predetermined density specific to a PPTA film and produce an intrinsic physical value, and obtaining a molded product of the PPTA film.

In this case, the film obtained by the first process is preheated at 200° C. or more to 330° C. or less after the first process.

According to another film molding method of this invention, in a film molding method of hot-press molding a PPTA film, the first process hot-press molds a PPTA film containing water at least 50% or more, or preferably 80% or more, as a swelling agent, by metal molds heated to 220° C. or less, or preferably 190° C. or less for a predetermined time period, and the second process hot-press molds the film for a predetermined time period by metal molds heated up to at least 330° C., or preferably 350° C. or more to produce a PPTA molded product in the manner like the second process of the first film molding method.

By dividing the method into the two processes, a cooling time for one mold cycle becomes zero.

However, without the cooling process, the metal molds are released immediately after the heat process, i.e., at a temperature of 350° C. or more, the film is likely to be deformed. In view of this, each of the male and female metal molds are provided with an air suction unit and an air exhaust unit so as to make a film tightly attache to one of the metal molds when they are released.

The film molding apparatus uses either the first or second film molding method, and has holes or slits opening at the surface of each of the metal molds, and an air suction unit and an air exhaust unit provided for each of the metal molds.

The film molding method of this invention using the film molding apparatus of this invention can omit a cooling process, resulting in a greatly reduced one old cycle time. Furthermore, since the metal molds are released while a molded film is tightly attached to the one of the metal molds, there is no fear of deformation of the film to be caused by friction when the metal molds are released, even if the film takes a high temperature, thereby obtaining a molded product of a high quality.

BRIEF DESCRIPTION OF THE DRAWINGS

FIG. 2 is a side view in section of the molding machine explaining a first molding method with a gel film being disposed at the intermediate of metal molds.

FIG. 3 is a side view in section of the molding machine explaining the first molding method with the gel film being clamped by the metal molds.

FIG. 4 is a side view in section of the molding machine explaining the first molding method with the upper metal mold being released.

FIG. 11 is a side view in section of the conventional molding machine wherein the gel film has been molded, the metal molds have been released, and the molded film is dismounted from the metal molds.

FIG. 12 is a side view in section of a conventional molding machine where a gel film forming has been completed and the metal molds have been released.

FIG. 15 is a side view in section of the conventional molding machine with the hard film being molded.

FIG. 16 is a side view in section of the conventional molding machine wherein the hard film has been molded, the metal molds have been released, and the molded film is dismounted from the metal molds.

DETAILED DESCRIPTION OF THE PREFERRED EMBODIMENTS

Figure 1:
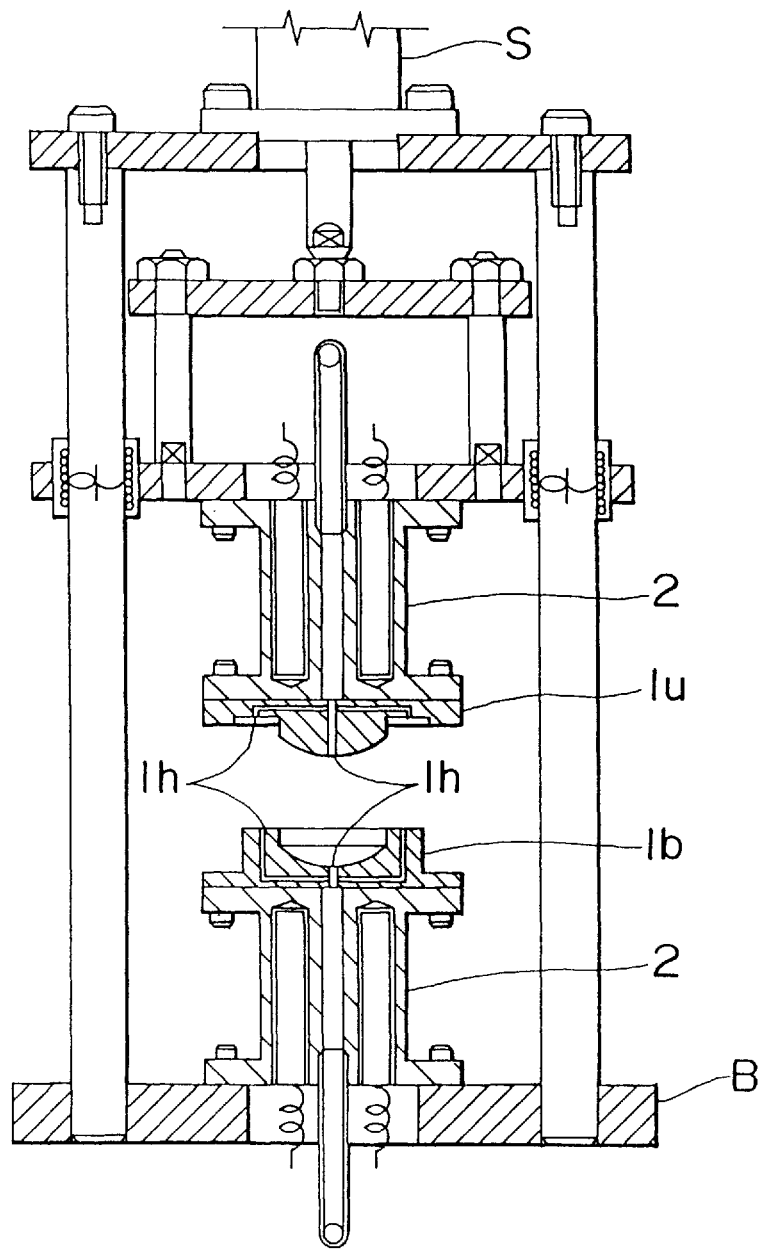
FIG. 1 is a front view in section of a molding machine used for a film molding apparatus according to an embodiment of the present invention.

An embodiment of a film molding method according to the present invention as well as a molding machine using the embodiment method will be described with reference to FIGS. 1 to 8. As shown in FIGS. 1 and 2, metal molds 1u and 1b are mounted on heater blocks 2. In this embodiment, the upper metal mold 1u is mounted at the end of a pressure cylinder S, whereas the lower metal mold 1b is mounted on the molding machine on its base B side. The upper and lower metal molds 1u and 1b are formed with fine holes or slits 1h.

As shown in FIG. 2, these holes 1h are guided to the outside of the metal molds, and connected via switches 3 to air suction units 4 and air exhaust units 5.

Figure 6:
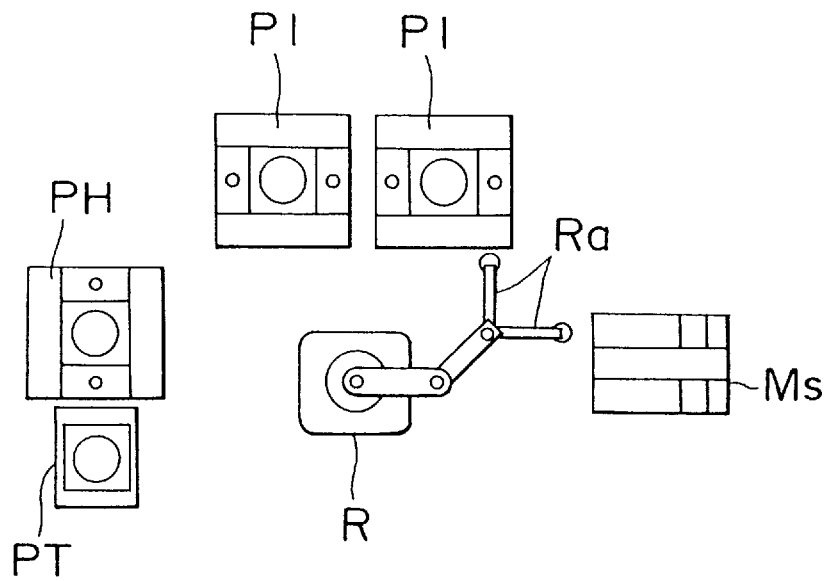
FIG. 6 shows the arrangement of the film molding apparatus using the first molding method.

The arrangement of the film molding apparatus used with the molding machine is shown in FIG. 6. This film molding apparatus has a material supply unit Ms, molding machines explained with FIGS. 1 and 2, a trimming press PT, and a robot R. Three molding machines are used, two machines being used as primary molding machines P1, and one machine being used as a thermal treatment molding machine PH.

The first molding method molds a gel film containing water at least 50% or more, preferably 80% or more, as a swelling agent. The gel film Fg used contains water 80% or more as a swelling agent, and has a thickness of about $140\mu$ (finished thickness of $25\mu$) and a percentage elongation at break of about 100%. The film Fg is formed in a roll having at a predetermined width, and immersed in a water vessel of the material supply unit Ms so as not to evaporate water as the swelling agent.

A necessary amount of the film Fg is fed out of the material supply unit Ms and the film Fg is cut to have a predetermined length. The cut film Fg is picked up by a robot arm Ra of the robot R and transported to the primary molding machine P1. As shown in FIG. 2, the transported film Fg is set at the intermediate of the upper and lower metal molds 1u and 1b, and as shown in FIG. 3 it is hot-press molded by the upper and lower metal molds 1u and 1b both heated to 200° C.

The pressure cylinder S is lowered, and immediately before the film Fg contacts the upper metal mold 1u, the switch valves 3 connected to the upper and lower metal molds 1u and 1b are switched to the air suction units 4 and at the same time the air suction units 4 are operated. In this condition, at the same time of the clamping start, water contents attached to the surface of the film Fg are sucked and exhausted out of the metal molds. The metal molds are further lowered, and when they completely clamp the film Fg, the latter is molded to have a shape matching the inner wall of the metal molds. At this complete clamping state, water contained in the film Fg is evaporated by the heat of the metal molds, and exhausted out of the holes 1h formed in the upper and lower metal molds 1u and 1b via the air suction units 4 into the outer air in about one to two minutes.

After water contents contained in the film Fg are completely driven away from the film Fg, the upper and lower metal molds 1u and 1b are released. In this state, although the film Fg has been molded into a predetermined shape, the gel film Fg with its water contents having been removed is still in an amorphous phase and remains as a molded hard film Ff. This molded hard film Ff does not still provide the physical value specific to a PPTA, and therefore has an insufficient mechanical strength. In the following, this hard film Ff is called a primary molded film h1.

The hard film Ff having an insufficient mechanical strength is likely to be deformed. If the metal molds are released under this condition, deformation by friction generated when releasing the metal molds becomes greater. In order to avoid such deformation, as shown in FIG. 4, the air suction unit 4 for the upper metal mold 1u is stopped, and the switch valve 3 is switched to the air exhaust unit 5. Under this condition, the air exhaust unit 5 is operated and the cylinder 3 is raised to release the upper and lower metal molds 1u and 1b.

Figure 5:
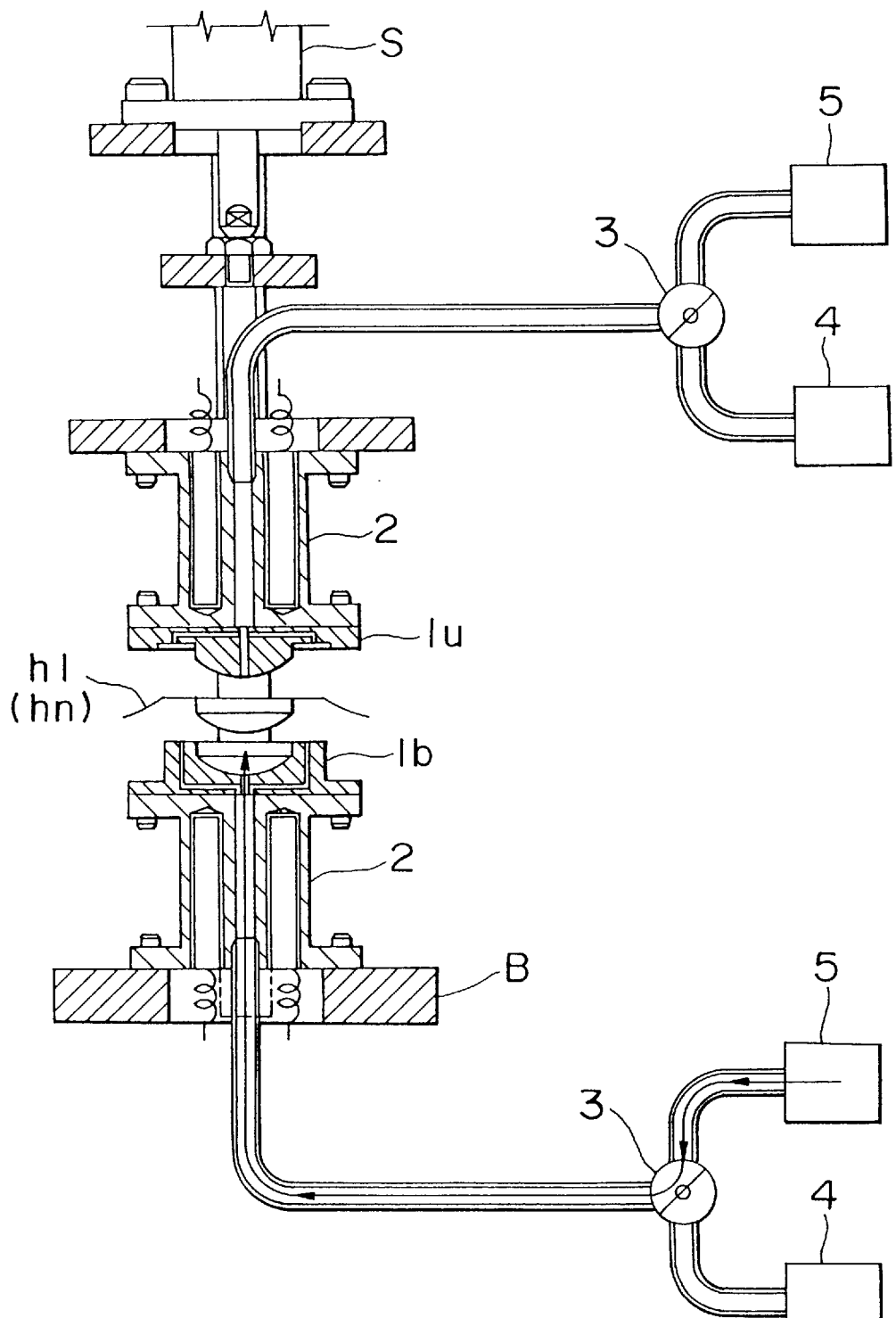
FIG. 5 is a side view in section of the molding machine explaining the first molding method with a primary molded film being dismounted from the lower metal mold.

Specifically, air exhausted from the upper metal mold 1u peels off the primary molded film h1 tightly attached to the upper metal mold 1u, and in addition, the primary molded film h1 is being tightly attached to the lower metal mold 1b by the continued operation of the air suction unit 4 for the lower metal mold 1b. Under this condition, the upper metal mold 1u is released. After this release, the surface of the primary molded film h1 is cooled slightly by environmental air. Thereafter, as shown in FIG. 5, the air suction unit 4 for the lower metal mold 1b is stopped, and the switch valve 3 is switched to the air exhaust unit 5. As the air exhaust unit 5 is operated, the primary molded film h1 floats upward by the air pressure and is dismounted from the lower metal mold 1b.

Next, the robot R transports the primary molded film h1 to the site of metal molds 1u and 1b of another thermal treatment molding machine PH. The thermal treatment molding machine PH has the structure and function basically similar to those of the primary molding machine P1, and the structure of the upper and lower metal molds 1u and 1b is basically similar. The temperature of the upper metal 1u mold has been set to 380° C., and that of the lower metal mold 1b has been set to 250° C. The primary molded film h1 is disposed at the intermediate of the upper and lower metal molds to press it for about 30 seconds for thermal fixation.

This thermal treatment is performed to crystallize the amorphous primary molded film H1 in order that a predetermined density of a PPTA film is given to a amorphous hard film Ff and an intrinsic physical value is produced. At this stage, the primary molded film f1 is eventually transformed into a molded film having an intrinsic mechanical intensity. In the following, this molded film is called a thermal treatment molded film hn.

In this hot-press process, when the primary molded film h1 is placed on the lower metal mold 1b, the switch valve 3 for the lower metal mold 1b is switched to the air suction unit 4. At the same time, the air suction unit 4 is operated to tightly contact the primary molded film h1 with the lower metal mold 1b. Thereafter, the upper metal mold 1u is lowered to completely clamp the primary molded film h1 by the upper and lower metal molds 1u and 1b. Under this condition, the thermal treatment described above is performed.

In releasing the metal molds, the switch valve 3 for the upper metal mold 1u is switched to the air exhaust unit 5. While the air exhaust unit 5 operates, the cylinder S is raised to release the metal molds. In this case, similar to the primary molded film process, the molded film tightly attached to the upper metal mold 1u is peeled off by exhaust air from the upper metal mold 1u, and because the air suction unit 4 for the lower metal mold 1b continues its operation, the upper metal mold 1u is released while the thermal treatment molded film is sucked to the lower metal mold 1b. After releasing the upper metal mold 1u, the film is rapidly cooled by environmental air down to about 250° C. Thereafter, the air suction unit 4 for the lower metal mold 1b is stopped, and the switch valve 3 is switched to the air exhaust unit 5 to operate it and dismount the thermal treatment molded film. This molded film is transported by the robot R to the trimming press PT to trim unnecessary areas of the molded film to complete the film in the shape of, for example, a diaphragm.

A PPTA gel film Fg used with the second molding method, contains water at least 50% or more, preferably 80% or more, as a swelling agent, and has a thickness of about $140\mu$. The gel film Fg is placed in an oven at about 180° C. to evaporate water contained in the gel film to thus obtain an amorphous hard film Fg thus thermal treated in an unrolled state and having a density lower than an intrinsic value. This hard film Ff has a percentage elongation at break of about 70% and a thickness of 25 μf.

Figure 7:
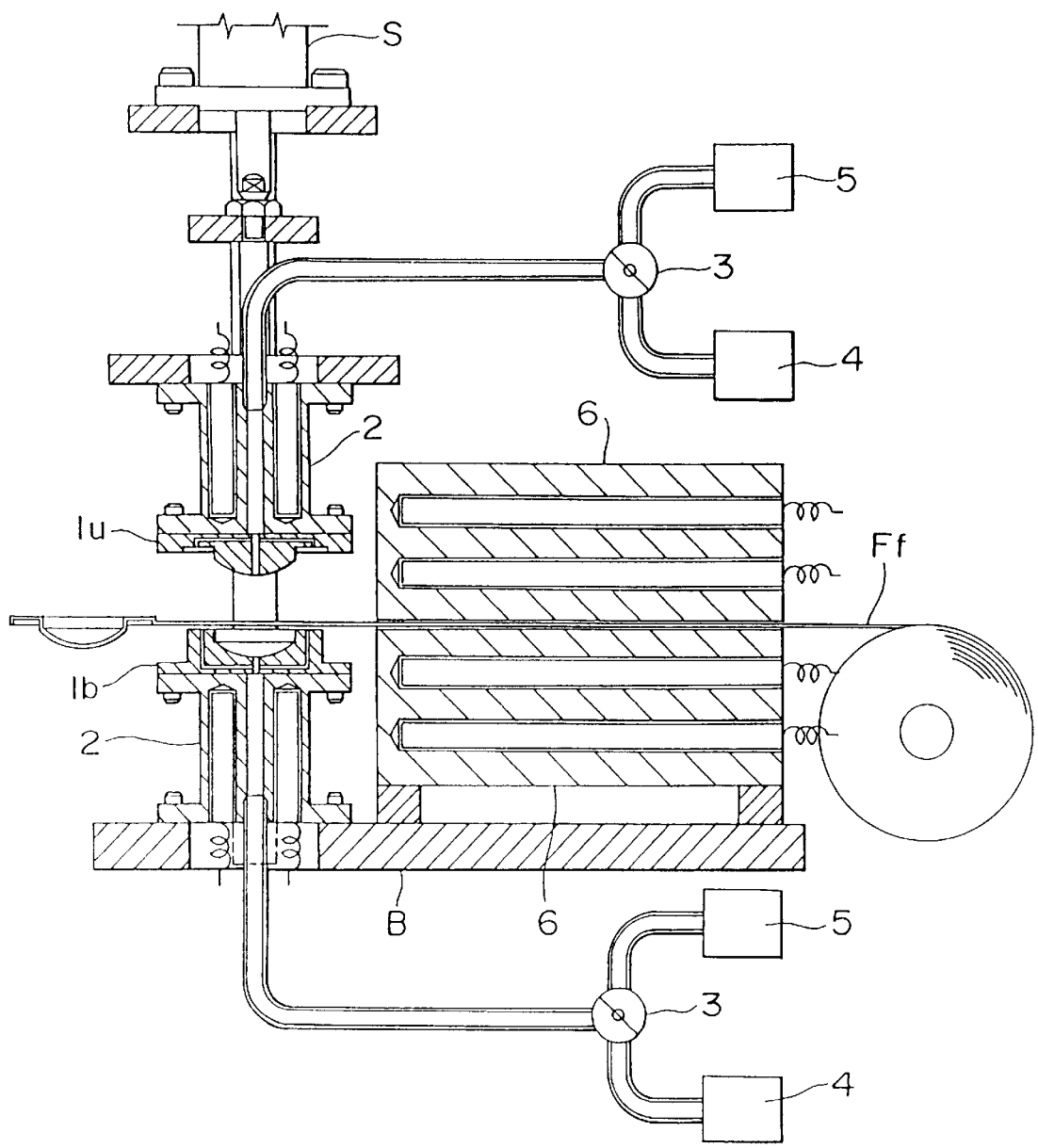
FIG. 7 is a side view in section of the molding machine explaining a second molding method with a hard film being disposed at the intermediate of metal molds.

As shown in FIG. 7, this hard film is guided into a 50μ gap between heater blocks 6 heated to 250° to 330° C. to preheat the film and further increase the percentage elongation at break. After this preheat, the film Ff is fed to the site of mold metals 1u and 1b. The upper metal mold 1u has been heated to 380° C., and the lower metal mold 1b has been heated to 250° C. The film Ff is hot-press molded and at the same time thermally fixed for about 30 seconds by the upper and lower metal molds. Releasing the upper and lower molds is the same as the first molding method.

Figure 8:
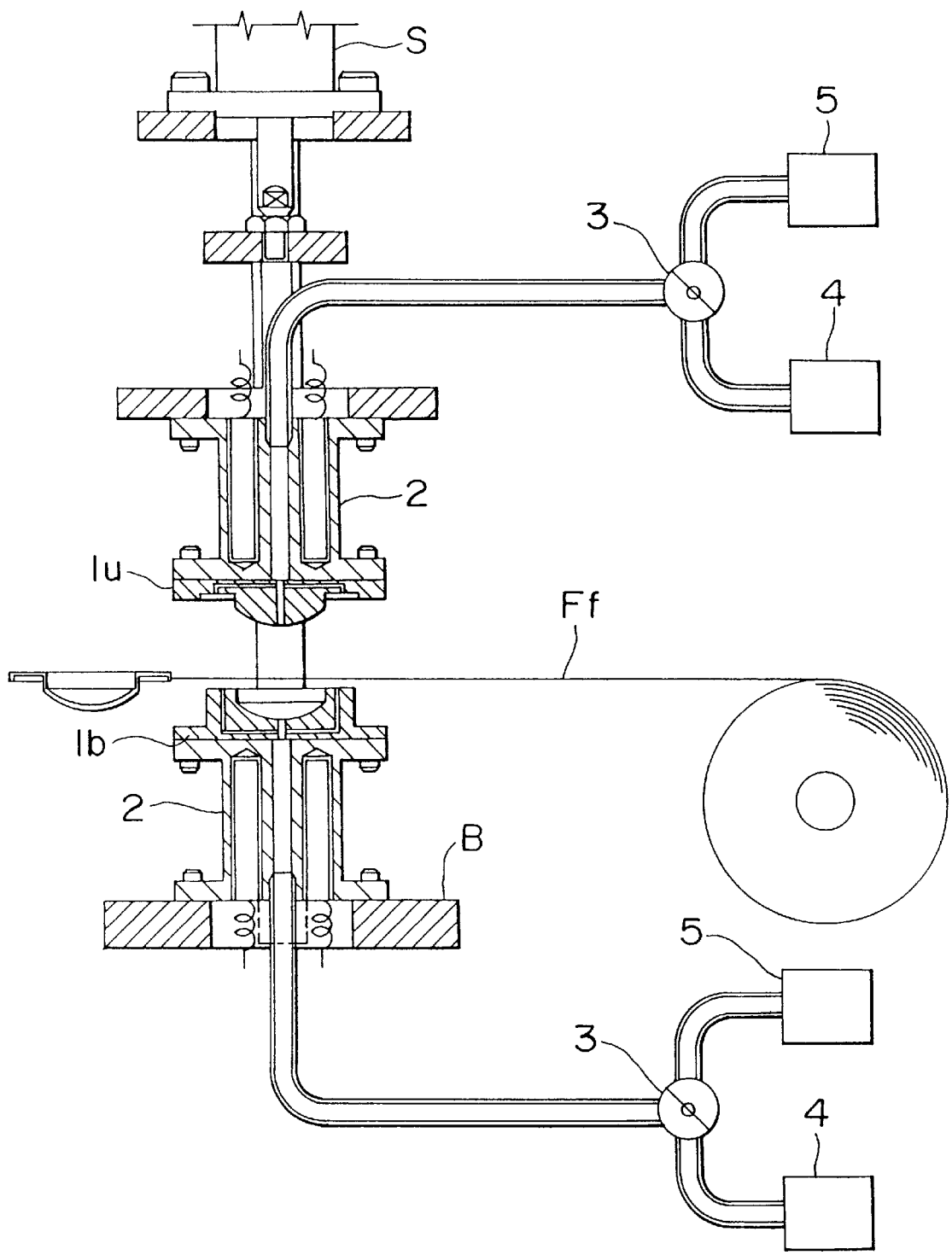
FIG. 8 is a side view in section of the molding machine explaining a third molding method with a hard film being disposed at the intermediate of metal molds.
Figure 9:
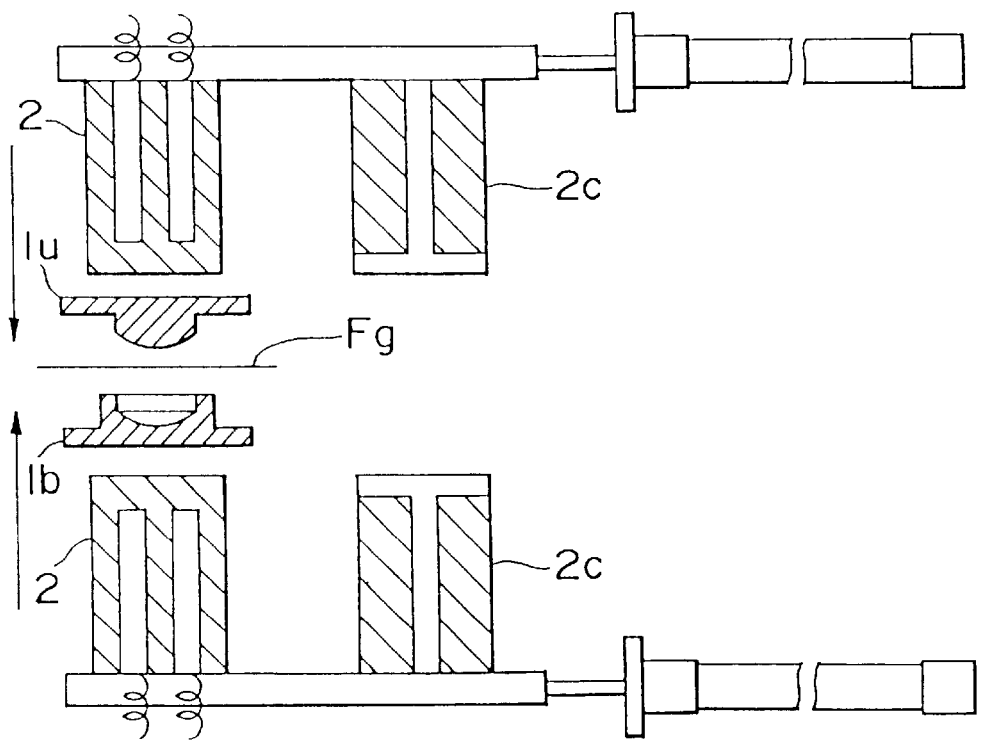
FIG. 9 is a side view in section of a conventional film molding machine.
Figure 10:
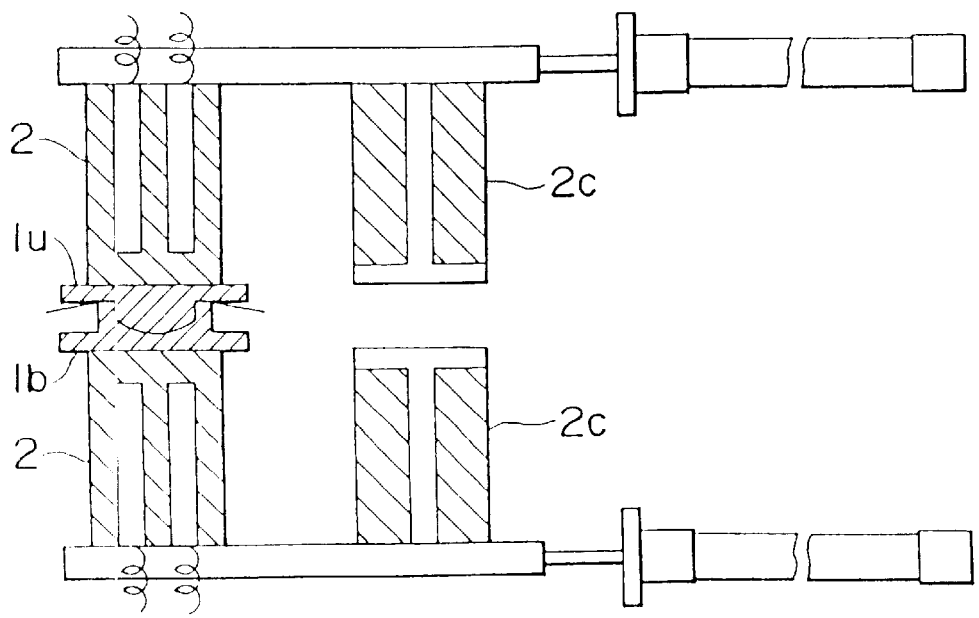
FIG. 10 is a side view in section of a conventional molding machine with a gel film being clamped by metal molds.
Figure 1:
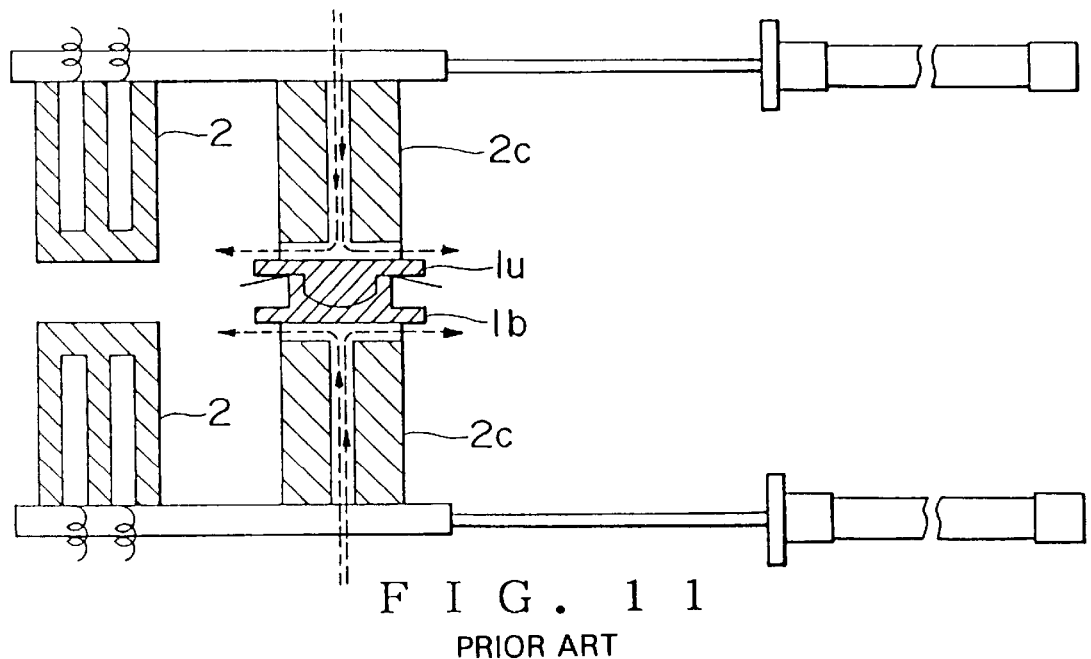
Figure 1:
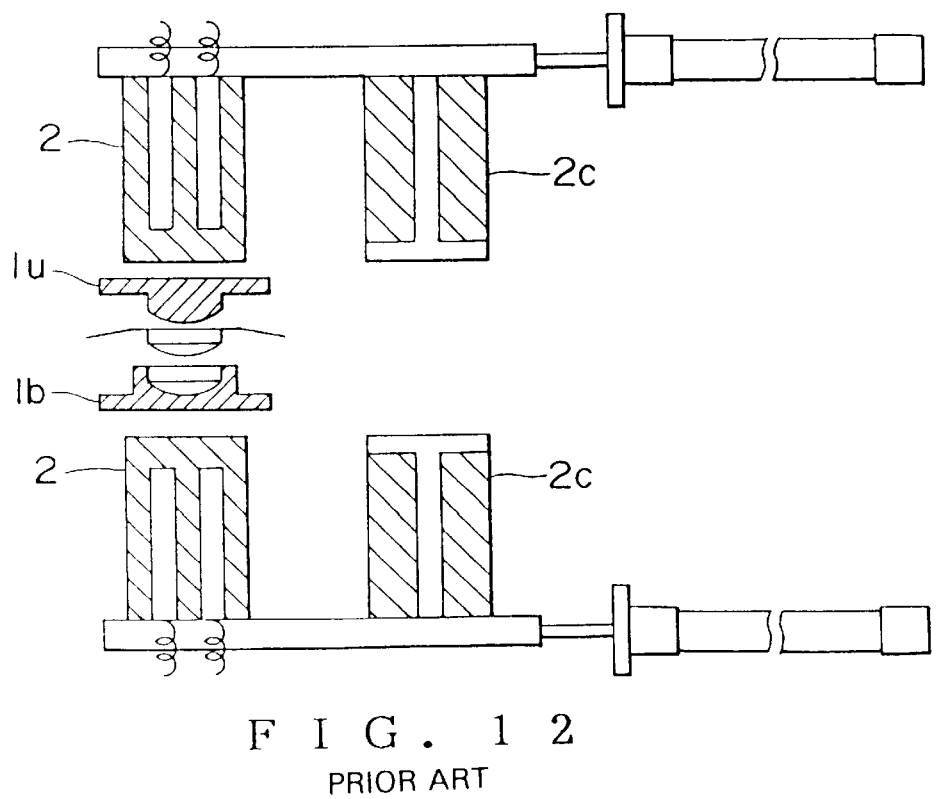
Figure 13:
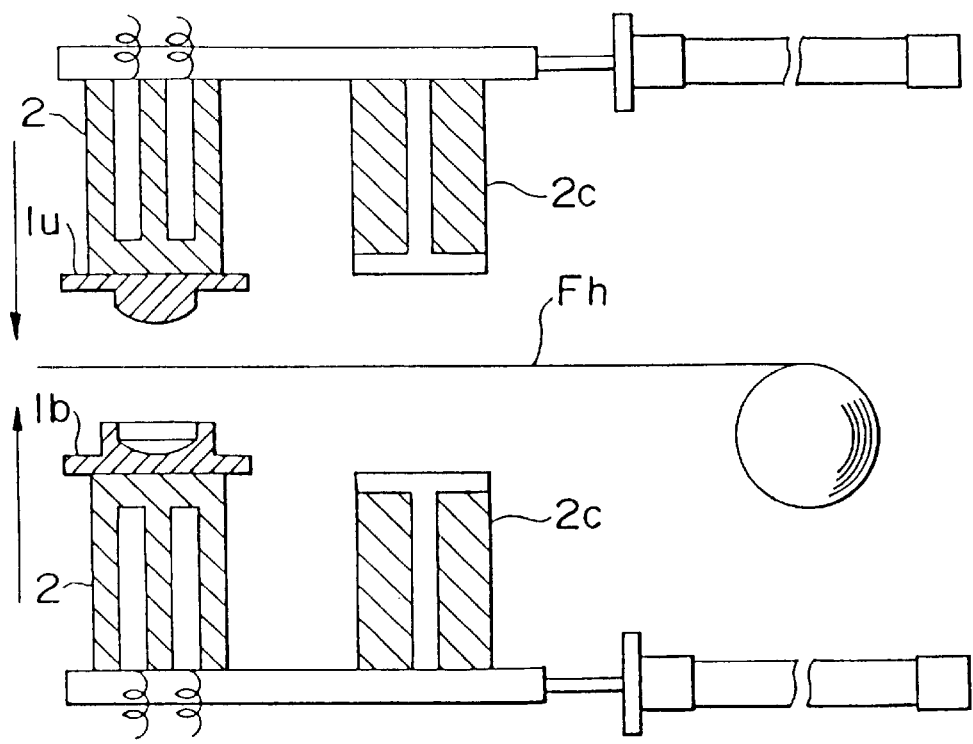
FIG. 13 is a side view in section of a conventional molding machine with a hard film being disposed at an intermediate of metal molds.
Figure 14:
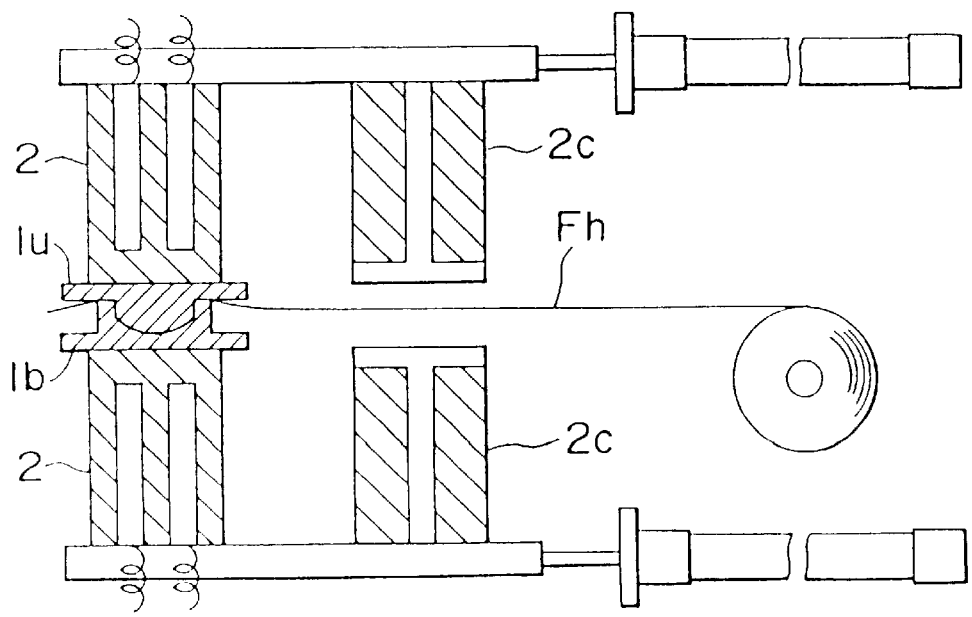
FIG. 14 is a side view in section of the conventional molding machine with the hard film being clamped by the metal molds.
Figure 1:
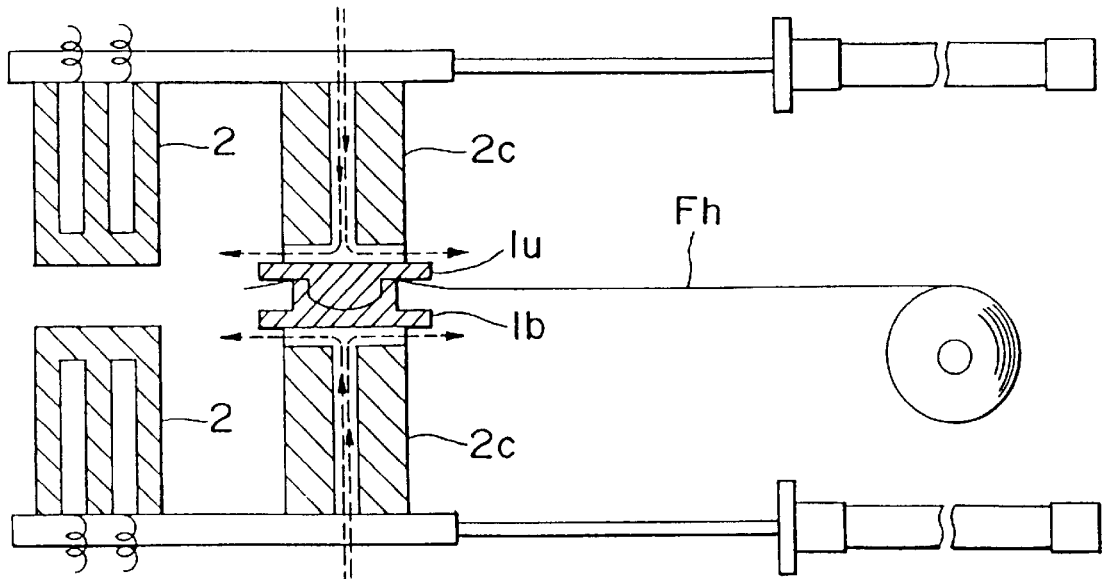
Figure 1:
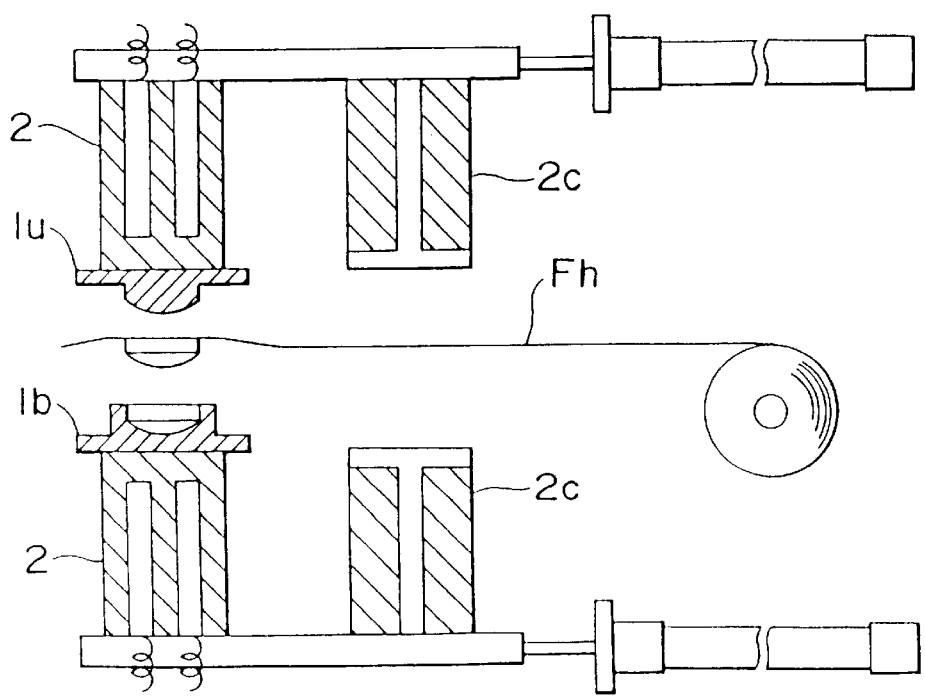

Like the second molding method in the third molding method, water as the swelling agent contained in a PPTA gel film Fg is evaporated in an oven at about 180° C. to obtain an amorphous hard film Fg having a density lower than an intrinsic physical value. As shown in FIG. 8, without performing a preheat process, this film Ff is guided to the site of metal molds 1u and 1b. The upper metal mold 1u has been heated to 380° C., and the lower metal mold 1b has been heated to 250° C. The film Ff is hot-press molded and at the same time thermally fixed for about 30 seconds by the upper and lower metal molds. Releasing the upper and lower molds 1u and 1b is the same as the first molding method.

In all of the first to third molding methods, the switch valves 3, air suction and exhaust units 4 and 5 connected to the upper and lower metal molds 1u and 1b have been operated. If a molded film can be smoothly dismounted without operating the air suction and exhaust units, which depends upon the molding conditions such as a shape of a molded film, the valves 3 and units 4 and 5 are not required to be operated, or they are not necessary at all.

The embodiments of the invention each have a particular characteristic. The first molding method is suitable for a deepest press and a complicated shape of a molded film. The second and third molding methods becomes in this order suitable for a shallower press and a simpler shape of a molded film. From the viewpoint of facilities at the film molding work site, the third molding method requires most simple facilities, and the second and first molding methods in this order require more complicated facilities.

When a loudspeaker diaphragm was molded by the above-described molding methods, as compared to one mold cycle time of about 5 minutes of a conventional molding method, one mold cycle time of the first molding method was 1 minute and 30 seconds to 2 minutes and 30 seconds being shorted by 50 to 70%, and one mold cycle time of the second and third molding methods was 30 seconds being shorted by 90%. As a result, the productivity was improved about two times to ten times.

According to the film molding method of this invention, one mold cycle time can be shortened considerably as compared to a conventional molding method, and therefore the productivity can be improved greatly.

There is no deformation of molded products, allowing to obtain products of an excellent quality.

The molding apparatus of this invention can be reduced in practice without changing conventional apparatuses greatly, and can perform easily the film molding method of the invention.

What is claimed is:

1. A film molding method of hot-press molding a film made of polyparaphenyleneterephthalamide and containing a swelling agent, into a predetermined shape, said method comprising:

a first process of evaporating the swelling agent from a polyparapheneleneterephthalamide film containing at least 50% or more swelling agent so that the swelling agent containing film becomes an amorphous film which has a density less than a predetermined density and percentage elongation at break of about 70%;

a second process of hot-press molding said polyparaphenyleneterephthalamide film for a predetermined time period by metal molds heated to at least 330° C. to crystallize said film to said predetermined density, said second hot pressing molding process occurring subsequent to, and noncontemporaneous with, said first evaporating process.

2. A film molding method according to claim 1, wherein said polyparaphenyleneterephthalamide film has a modulus in tension of 600 Kg/mm$^2$ or more.

3. A film molding method according to claim 2, wherein said polyparaphenyleneterephthalamide film contains 80% or more swelling agent prior to said first process of evaporating the swelling agent.

4. A film molding method according to claim 1, wherein said polyparaphenyleneterephthalamide film is molded by said metal molds heated to 350° C. or more in said second process of hot-press molding.

5. A film molding method according to claim 1, wherein said film obtained by said first process is preheated to a temperature between 200° C. and 330° C. after said first process.

6. A film molding method of hot-press molding a film made of polyparaphenyleneterephthalamide and containing a swelling agent, into a predetermined shape, said method comprising:

a first process of hot-press molding a polyparaphenyleneterephthalamide film containing at least 50% or more swelling agent, by a first set of metal molds heated to 220° C. or less for a predetermined time period, and producing a primary molded product of said film; and a second process of hot-press molding said primary molded product for a predetermined time period by a second set of metal molds heated up to at least 330° C. to crystallize said primary molded product to have a predetermined density.

7. A film molding method according to claim 6, wherein at least one of said first and said second sets of metal molds includes a male type metal mold and a female type metal mold which mates with the male type metal mold, wherein one of said male type metal mold and said female type metal mold is released by attaching said polyparaphenyleneterephthalamide film molded product to one of said male metal type mold and said female type metal mold in a sucked manner.

8. A film molding method according to claim 6, wherein said polyparaphenyleneterephthalamide film has a modulus in tension of 600 Kg/mm$^2$ or more.

9. A film molding method according to claim 8, wherein said swelling agent is water, said polyparaphenyleneterephthalamide film containing 80% or more water prior to said first process of hot-press molding.

10. A film molding method according to claim 6, wherein said polyparaphenyleneterephthalamide film is molded by said first set of metal molds heated to 190° C. or less in said first process of hot-press molding.

11. A film molding method according to claim 6, wherein said primary molded product is molded by said second set of metal molds heated to 350° C. or more in said second process of hot-press molding.

* * * * *